United States Patent [19]
Paterno, Jr. et al.

[11] 3,793,783
[45] Feb. 26, 1974

[54] SEGMENTAL CUT-OFF GRINDING WHEEL

[75] Inventors: Joseph J. Paterno, Jr., Sterling Junction; Norton S. Remmer, Worcester; Hussain G. Lakhani, Holden, all of Mass.

[73] Assignee: Norton Company, Worcester, Mass.

[22] Filed: Oct. 2, 1972

[21] Appl. No.: 294,083

[52] U.S. Cl. .......................................... 51/206.5
[51] Int. Cl. ........................ B24d 5/06, B24d 5/08
[58] Field of Search .......... 51/206 NF, 206.4, 206.5

[56] References Cited
UNITED STATES PATENTS

| | | | |
|---|---|---|---|
| 1,502,697 | 7/1924 | Tone | 51/206.5 |
| 1,697,505 | 1/1929 | Hyde | 51/206.5 |
| 237,472 | 2/1881 | Blackburn | 51/207 |
| 3,162,187 | 12/1964 | Christensen | 125/15 |
| 1,783,729 | 12/1930 | Larsson | 51/206.5 |

FOREIGN PATENTS OR APPLICATIONS

| | | |
|---|---|---|
| 530,992 | 7/1931 | Germany |
| 1,652,883 | 3/1971 | Germany |

*Primary Examiner*—Othell M. Simpson
*Assistant Examiner*—Marc R. Davidson
*Attorney, Agent, or Firm*—Walter Fred

[57] ABSTRACT

A relatively large diameter high speed segmental cut-off grinding wheel and identical, interchangeable, and replaceable composite arcuate abrasive segments therefor each comprised of a fiber glass reinforced resin bonded abrasive portion resin bonded to an embedded portion of a relatively thin preformed segment base member made of metal or laminated fiber glass material adapted for easy removal and fastening of the abrasive segment to a thin reusable drive center with precision segment locating and retaining member thereon and a removable annular segment clamping ring fastened to the center.

10 Claims, 5 Drawing Figures

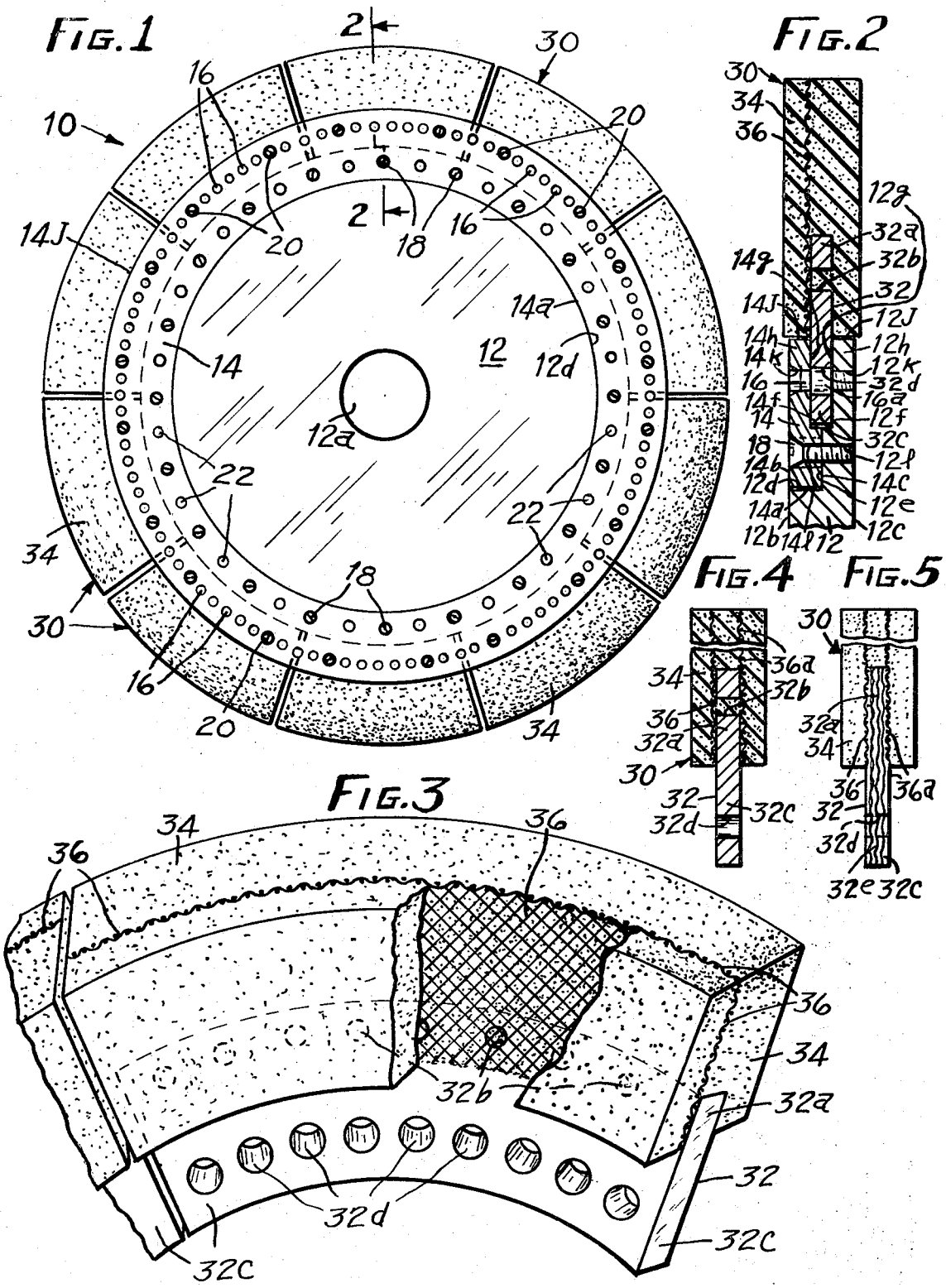

SEGMENTAL CUT-OFF GRINDING WHEEL

BACKGROUND OF THE INVENTION

1. Field of Invention

The invention relates to a relatively large diameter high speed segmental cut-off grinding wheel with a ring of detachable interchangeable and replaceable composite reinforced arcuate abrasive segments secured to a reusable rotatable drive center or hub.

2. Description of the Prior Art

Segmented cut-off grinding wheels in themselves are not new and various forms have been disclosed by the prior art which in general embody the attachment of bonded abrasive segments or annuli to the periphery of a rotatable hub or center with an adhesive, by dovetailing, clamping or bonding a slotted segment to the hub and clamping or bonding a relieved segment base member within a slotted hub or in between a pair of discs bolted or bonded together to form a composite hub. In U.S. Pat. No. 237,472 issued to Blackburn on Feb. 8, 1881; 3,162,187 issued to Christensen on Dec. 22, 1964; 2,092,591 issued to Sohlstrom on Sept. 7, 1937; German Pat. No. 530,992 issued to Krug on July 23, 1931; and 1,652,887 issued to Berstecher on Mar. 11, 1971, there are disclosed various prior art grinding wheels which the applicant is aware of that are similar to but distinguishable from the invention disclosed herein below.

The invention differs from the prior art in that each of the abrasive segments is a strong interchangeable reinforced composite segment having a resinoid bonded abrasive portion resin bonded to either a one piece or a laminated segment base member partially embedded in the abrasive portion and coupled or interconnected by at least one layer of reinforcing material bonded to and extending radially through the abrasive member and bonded to at least one side of the segment base member which is of less axial thickness than the abrasive section and the precision reusable support center or hub on which it is located and fastened thereto in a predetermined precise manner.

SUMMARY OF THE INVENTION

A segmental cut-off grinding wheel of relatively large diameter having a thin reusable drive center or hub adapted with suitable mounting means by which it may be rotatably driven at high speed about a central axis in the conventional manner. The thin drive center or hub is of two piece construction providing a narrow peripheral slot or groove extending circumferentially around the center and radially inward from the periphery, a predetermined depth, to an inner shoulder or recessed surface at the bottom thereof. A plurality of equally spaced precision locating pin holes and/or bolt holes are provided on the drive center for precisely aligning and clamping composite abrasive segments thereon. The composite bonded abrasive segments are identical and each comprises a thin segment base member with an outer radial portion embedded and extending radially into a thicker arcuate bonded abrasive portion resin bonded thereto and an inner radial portion or tongue portion projecting therefrom into the narrow slot between spaced annular flange portions of the hub. In the tongue portion are a plurality of segment locating holes equally spaced angularly to mate and align with the equally spaced locating holes in the center or hub and through which locating pins and/or clamping bolts extend to align and retain the interchangeable composite abrasive segments to the hub.

Each composite bonded abrasive segment has at least one layer of reinforcing material, such as, open mesh fiber goass cloth embedded therein and resin bonded to one side of the outer radial portion of the thin segment base member or shoe which can be either a laminated structure of bonded layers or plies of fiber glass material or a single piece of metal. The composite abrasive segments may be made by assembling individual preformed cold pressed layers of a suitable abrasive mix containing abrasive and uncured resin bonding material, a preformed segment base member, at least one precut layer of resin coated reinforcing material and bonding them into an integral structure by baking and curing the resin bond.

In another embodiment the outer radial portion of the segment base member, which may have holes or other means for interlocking the abrasive portion thereto, a preformed layer of resin coated reinforcement, and abrasive mix including resinoid bonding material is placed in a mold cavity and simultaneously hot pressed to the desired shape and bonded together by baking and curing the resin bond.

Each cured composite resin bonded abrasive segment is then placed in a precision fixture and the desired number of locating member and/or bolt holes are precisely located and drilled therein to mate with the holes in the reusable hub or center onto which the segments are assembled on locating members and clamped between the fixed and removable flange portions.

Therefore it is the primary object of the invention to provide relatively large high speed segmental cut-off grinding wheels with a reusable center and identical, interchangeable, replaceable, preformed, reinforced composite resin bonded abrasive segments therefor.

BRIEF DESCRIPTION OF THE DRAWING

FIG. 1 is a side view of an assembled segmented cut-off wheel of the invention;

FIG. 2 is a cross-sectional view through one of the composite abrasive segments and a portion of the reusable center taken on line 2—2 of FIG. 1;

FIG. 3 is a perspective view of one of the composite abrasive segments of the invention;

FIG. 4 is an end view of a modified form of the composite abrasive segment; and

FIG. 5 is an end view of another modified form of the composite abrasive segment.

DESCRIPTION OF THE PREFERRED EMBODIMENTS

Referring to FIGS. 1 and 2 there is shown a segmental cut-off grinding wheel 10 which has a relatively small axial thickness of between one-fourth to three-fourths of an inch compared to its diameter which can be in a range between 2 to 6 feet. The segmented wheel 10 comprises a thin rotatable drive center, disc or hub 12 with suitable conventional means, such as, a center hole 12a of suitable diameter for mounting the grinding wheel 10 on suitable drive means such as a rotatably driven spindle of a cut-off machine. The reusable drive center or hub 12 as shown in FIG. 2 is generally of circular shape and has opposite sides or surfaces 12b and 12c extending radially outward from the center hole 12a about the axis of the center 12. Side or side surface 12b extends radially outward to a first or inner circular shoulder or surface 12d extending a predetermined depth in an axial direction to a first or inner annular recessed surface 12e extending radially, outward substantially parallel to the side surface 12c, to a second or outer circular shoulder or bottom surface 12f. The outer circular shoulder 12f extends substantially parallel to and concentric with the axis of the drive center 12 to a second or outer annular recessed surface and/or segment aligning surface 12g of a fixed or integral flange portion 12h extending radially outward to the circumferential or circular peripheral surface 12j of the drive center or hub 12. Opposite the fixed flange portion 12h is a removable annular segment clamping flange or segment retaining ring 14 with a relatively large center hole, about which there is an internal or locating surface 14a, of slightly larger diameter than that of the smaller inner circular shoulder 12d within the removable clamping flange or retaining ring 14. The removable annular clamping flange 14 also has as shown outer and inner annular sides or side surfaces 14b and 14c extending radially outward from the internal surface 14a substantially parallel to each other and to the surface 12c of the hub 12. Inner annular surface 14c is opposite and of substantially the same size and area as the first or inner recessed surface 12e and extends radially to a third or coaxial circular shoulder or bottom surface 14f or substantially the same diameter as the shoulder or bottom surface 12f. Shoulder 14f extends in an axial direction to a fourth or opposite outer annular recessed clamping surface and/or segment clamping side 14g of an opposing removable clamping flange portion 14h spaced from the fixed flange portion 12h.

Both of the flange portions 12h and 14h have a plurality of axially aligned holes 12k and 14k for receiving segment locating and retaining means. The holes 12k and 14k are preferably equally spaced angularly around the flange so their centers or axes lie on the same base circle or circular path and at the same predetermined radius from the axis of the hub 12. Inserted in the holes 12k and 14k are a plurality of segment locating and retaining members such as studs, pins and/or bolts which if desired may be fixed or attached to the flange portion 12h in any suitable manner as by threading, staking, pressing or slipping them therein. The pins and/or bolts have either a straight cylindrical portion of one diameter or one or more shoulders and cylindrical portions of slightly different diameter. Alternatively the segment locating and retaining means may comprise alternating bolts and pins on the same base or bolt circle.

In the embodiment shown the segment locating and retaining members comprises a plurality of identical shoulder type pins or studs 16 each having opposite cylindrical end portions of substantially the same or slightly different diameter pressed lightly into closely fitting holes 12k and 14k and extending axially to the shoulder of a slightly larger cylindrical center portion 16a which passes through a closely fitting hole in the segment base member, of each composite bonded abrasive segment, mounted within the narrow circular segment aligning groove or space extending radially inward between the flange portions 12h and 14h from the periphery 12j and 14j a predetermined depth to the bottom surfaces or shoulders 12f and 14f. In addition there are a plurality of threaded holes 121 in the center or hub 12 in axial alignment with a bolt or screw hole 141 in the removable clamping flange or retaining ring 14 and into which a plurality of removable clamping bolts 18 are provided for clamping and maintaining the composite segments in place against the segment aligning surface 12g. The screws or bolts 18 may be staked, adhesively secured or locked in place to prevent loosening during use of the grinding wheel 10.

Mounted around and attached to the reusable hub or drive center 12 are a plurality of identical interchangeable and replaceable composite reinforced resin bonded abrasive segments 30. Each composite segment 30 comprises a thin segment base member or segment support member 32 with an outer or upper radial portion 32a embedded in, interlocked with and resin bonded to the lower central portion of an abrasive portion, member or element 34. At least one layer of reinforcing material 36 is bonded to a side of the base member and extends radially through the abrasive portion 34 bonded thereto, to the outer circular peripheral or circumferential surface of the composite segments 34 and grinding wheel 10. The segment base member 32 may be either a one piece or a laminated structure of suitable high strength material, for example, metal, plastic, fiber reinforced plastic, and bonded fiber glass material.

The segment base member as shown in FIG. 3 is an arcuate or fan shape piece of material which may be as shown in FIG. 5 a laminated structure made of resin bonded layers of either open or closed mesh fiber glass cloth with either twisted strands or substantially untwisted roving. The segment base member 32 has on its upper portion 32a means for interlocking the abrasive portion or member 34 thereto comprising a plurality of aperatures or holes 32b through which the bonded abrasive material extends and interconnects opposite sides of the abrasive member 34. Projecting radially inward from the under side or inner side and smallest radius of the arcuate abrasive portion 34 is a lower segment mounting portion or tongue portion 32c of the segment base member 32. The mounting portion 32c extends into the space, groove or slot formed between the annular recessed surfaces of the flange portions 12h and 14h and has a group or a plurality of equally spaced holes 32d axially aligned with holes 12k and 14k. The centers or axes of the holes 32d are angularly spaced the same as the axes of the holes 12k and 14k are spaced on the same base circle.

Abrasive portion 34 of each of the segments 30 is preferably made by molding or preforming and bonding together suitable layers of an abrasive mix or mixture containing at least abrasive particles and a resinoid bonding material, such as, a thermosetting phenolic resin. Abrasive particles may be natural or synthetic diamond, metal oxide, and carbide materials such as alumina, alumina-zirconia, silicon carbide, boron carbide, tungsten carbide, and mixtures thereof.

The composite segment 30 can be made in various ways one of which is to simultaneously mold and bond the abrasive mix, the layer of reinforcing material, and the upper portion 32a of the segment base member together to the desired size and shape determined by the mold. For example, a typical convention mold with a mold cavity of predetermined dimension to produce the desired arcuate shape, depth and thickness of the abrasive portion 34 and means to position and support the segment base member 32 therein so the outer radial portion 32a projects into the cavity. First an outer layer of the abrasive mix of predetermined depth required to form an outer side portion of the abrasive portion 34 is spread upon the bottom of the mold cavity. One preformed piece of reinforcing material cut out of a sheet of Lewcott 35 open mesh woven roving fiber glass cloth with 3-½ openings per inch precoated with a liquid phenolic resin bonding material fully cured thereon commercially available from Lewcott Chemical and Plastic Corporation, Millbury, Massachusetts is layed on the loose layer of mix. Then a preformed segment base member 30 is placed in the mold so that it extends into the cavity and over the reinforcing material the desired amount. More of the abrasive mix is spread to fill the space and form the central or inner layer between the outer edge of the segment base member and the mold wall and the interlocking holes 32b if present. Thereafter, either a final outer layer of abrasive mix is spread thereover or if desired a second piece of the preformed reinforcing glass cloth is first laid over the central or inner layer and a side of portion 32a followed by spreading a final outer layer of the abrasive mix thereover. The mold cavity is then closed with a suitable mold pressing plate and the mold placed between heatable platens of a conventional hot press, where the abrasive mix with the reinforcement and the segment base member are hot pressed and resin bonded into a unitary composite segment of the desired size and shape at a pressure of ½ to 1 ton p.s.i. and temperature of 165° C for approximately 15 minutes.

A typical conventional abrasive mix for making the hot pressed abrasive segment may comprise by weight the following ingredients based on a 10 pound batch.

6.67 lbs. 24 grit aluminum oxide abrasive premixed and wetted with 20 cc of furfural mixed with premixed bond consisting of 1.38 lbs. 5417 powdered phenolic resin available from Union Carbide.

1.71 lbs. iron pyrite filler 300 grit and finer and

.24 lb. calcium oxide lime (CaO).

The hot pressed composite segment is then stripped or removed from the mold and placed in an oven for a predetermined period of 15 hours at a predetermined temperature of 175° C to cure the thermosetting resin bond. After the molded segment is cured it is placed in a suitable precision drill jig or fixture for locating and drilling the segment locating and retaining pin and/or bolt holes 32d.

Referring to FIG. 4 there is shown a modified composite resin bonded abrasive segment 30 which has all of the components of the composite segment shown in FIGS. 2 and 3 and an additional preformed piece or layer of reinforcing material 36a bonded to the opposite side of a one piece segment base member 32. Another composite resin bonded abrasive segment 30 shown in FIG. 5 has a preformed laminated segment base member 32 composed of a plurality of inner or internal plies or layers 32e of fiber glass cloth made of Lewcott 229 closed mesh woven roving sandwiched in between and bonded together to two outer layers or preformed pieces 36 and 36a of Lewcott 955 open mesh (5 × 5) fiber glass cloth reinforcing material with five openings per inch extending radially through and bonded to the resin bonded abrasive section or portion 34. Both of the 229 and 955 glass cloth being precoated or preimpregnated with an uncured liquid thermosetting phenolic resin and commercially available from Lewcott Chemical and Plastic Corporation, Millbury, Massachusetts.

Composite resin bonded abrasive segments with laminated segment base members like that shown in FIG. 5 can be made in the following manner by:

1. Pressing together at 2.5 tons p.s.i. three plies or sheets of liquid resin coated Lewcott 229 closed mesh woven roving fiber glass cloth into a laminate 0.080 of an inch thick;
2. Stamping or cutting out of the three ply laminate the desired shape of segment base itself with a suitable steel rule die cutter;
3. Stamping or cutting out of a resin coated sheet of Lewcott 955 style open mesh woven fiber glass cloth approximately 0.008 of an inch thick two pieces of reinforcing material 36 and 36a, with another steel rule die cutter of the desired arcuate shape;
4. Cold pressing at 2 to 4 tons p.s.i. a conventional abrasive mixture of which a 10 pound batch comprises by weight 30 grit size aluminum oxide abrasive 7.49 lbs. aluminum oxide abrasive premixed and wetted with .32 lb. 9332 liquid phenolic resin (Union Carbide) mixed with premixed bond consisting of .95 lb. 5417 powered phenolic resin (Union Carbide)

1.24 lbs. iron pyrites filler 300 grit and finer and 28 cc of Carbosota

Individual layers of the abrasive mix are spread to a predetermined depth placed and cold pressed in suitable molds to form an inner or central arcuate abrasive preform 0.063 of an inch thick with an outer radius of 15 and ½ inches and an inner radius of 13 inches and two identical outer arcuate abrasive preforms each 0.108 of an inch thick of the same outer radius but smaller inner radius than the inner arcuate preform;
5. Assembling, positioning, and supporting the components in a fixture comprising a "Teflon" coated or covered flat support plate or batt with thickness or stop blocks 0.300 of an inch thick corresponding to the total thickness of the abrasive portion 34 placed adjacent thereto, a flat bottom plate extending under the laminated segment base portion to the inner radius of the lower outer abrasive preform of 0.105 of an inch corresponding to the desired final amount the abrasive preform overhangs or projects beyond the sides of the segment base member, stop blocks adjacent the laminated segment base member on the plate 0.090 of an inch thick corresponding to the desired thickness of the laminated projection, or tongue portion 32c of the segment base member 32, placing a top plate on top of the tongue portion of the same thickness (0.105) as the bottom plate so it extends to the inner radius of the upper abrasive preform and rests on the 0.090 thick blocks, placing a flat top plate or batt on top of the upper abrasive preform and the 0.300 inch thick blocks of sufficient weight to produce a force of about 8 pounds per square inch on the components of the composite segment; and
6. Placing the assembly in an oven for a period of 15 hours at a temperature of 175° C to first cause the resin to flow, then cure the thermosetting resin and bond the preformed components under a slight load into a unitary arcuate shape composite structure of the desired precise dimensions. During the bake and curing, the weight of top plate holds the plates, the blocks and the various components of the composite segment in contact with one another, prevent swelling to maintain the precise dimensions and positioning of the various components. As a result, there is substantially no dimensional change in the preformed components which are merely held together during the time the resin flows and finally cured.

Thus identical arcuate composite abrasive segments with either one piece metal or laminated segment base members and precise dimensions necessary to make them interchange can be formed, to have an outer peripheral radius of 15-½ inches, an intermediate radius of 13 inches at the shoulders overhanging the opposite sides of the segment base member equal amounts and an inner radius of 11-½ inches in radius on the segment base member. The abrasive portion or section being 0.300 thick × 2.5 inches in width or radial depth and the tongue 0.090 of an inch thick × 1.5 inches in radial width or depth with the abrasive section 34 overhanging the sides of the tongue equally, 0.105 of an inch.

Excess cured thermosetting phenolic resin flash or material is then removed and the precisely formed composite segment is placed and clamped in a drill jig. Nine three-eighths diameter holes were drilled and equally spaced 0.770 of an inch between centers measured on a chord of a base circle or arc with a radius of 12-¼ inches (24-½ inches in diameter) with the axes of the end holes equal distances from the radial end faces of the segment base member and a distance of about 0.770 of an inch from a radial plane passing between adjacent segments 30 of the grinding wheel 10.

The composite segments 30 are preferably of shorter arcuate length than the length of the arc extending between each pair of radial planes spaced angularly at predetermined equal angles of 36° around the axis of the hub 12. Thus when mounted on the hub 12 the segments 30 will be spaced from one another and have a space in this specific embodiment of about one-fourth of an inch.

Ten interchangeable composite abrasive segments 30 of the dimensions given above were then mounted on a two piece reusable steel drive center or hub with the following approximate dimensions: outside diameter of 25-15/16 inches; axial thickness of approximately 0.280 of an inch; a center hole of 1-¾ inches in diameter; a central segment aligning groove 0.090 wide × 1-15/32 inches in radial depth; a circular shoulder or bottom surface 12f of 11-15/32 inch radius and 22-15/16 diameter at bottom of the annular groove; and a removable steel clamping flange or retaining ring 14 25-15/16 inches in diameter × 0.141 of an inch axial thickness with a central hole 14a of 16-1/16 inches diameter; and an annular recessed surface 14g of about 0.045 of an inch in axial depth forming one half the 0.090 of an inch wide aligning groove. There were 100 equally spaced segment locating pin and/or threaded bolt holes five-sixteenths of an inch in diameter in the hub to which there were attached 10 equally spaced groups of nine equally spaced shoulder type segment locating pins 16 and/or bolts 20 on a bolt circle 24-½ inches in diameter, and 100 equally spaced 0.3762 of an inch diameter holes in the clamping flange or retaining ring into which extended the portions of largest diameter of the shouldered locating pins 16 and/or bolts 20.

Twenty equally spaced locating drive pin holes 0.4375 of an inch diameter alternating with 20 ¼–28P threaded holes were provided in the hub 12 located on a base circle 21-½ inches in diameter and to which were attached 20 shoulder type locating drive pins 22 with a maximum diameter of 0.500 of an inch reduced at one end to fit into the 0.4375 diameter holes. In the clamping flange 14 were 20 equally spaced 0.501 of an inch diameter locating drive pin holes, alternating with 20 equally spaced seventeen sixty-fourths inch diameter 82° counter sunk clamping bolt holes for receiving the 20 locating drive pins 22 and the 20 ¼–28 PUNF threaded clamping bolts or screws 18 respectively.

Each of the 10 interchangeable composite segments 30 is assembled on an adjacent group of projecting segment locating pins 16 attached to the hub 12, and the removable clamping flange or retaining ring 14 is placed onto both the projecting locating pins 16 and 22, then bolted together to clamp the segment base members securely between them. The bolts 18 being staked in the conventional manner to prevent loosening but not removal thereof to replace each worn out segment with a new segment 30 when it becomes necessary.

Thus, the assembled composite abrasive segments 30 on the hub of the dimension described above, by example only, produced a segmental cut-off grinding wheel with an outside diameter of 31 inches, equally spaced abrasive segments 0.300 of an inch thick with sides lying in a single plane about and normal to its axis of rotation and with a center hole 1-¾ inches in diameter. When the segment 30 have but one reinforcing member 36, the segments are assembled so that the reinforcing members of adjacent segments are staggered and alternately shifted from a position adjacent one side of the wheel to a position adjacent the opposite side. Hence all the reinforcement will not lie in a single nonabrading plane but is interrupted by at least one but preferably by a plurality of abrading portions of adjacent segments.

Segmented cut-off wheels of this type have been successfully tested and their performance compared with a conventional standard integral cut-off wheel of the same dimensions. As assembled, the static balance of the segmented wheel was within the seven-eighths oz. limitation for a wheel of the same size. The segmented wheel was repeatedly speed tested at approximately 3,900 RPM and 31,600 surface feet per minute without failure.

Dry cutting tests were performed by installing the segmented cut-off wheel as well as a comparable standard cut-off wheel on a 70 H.P. Massab Cut-off Machine and rotating them at 2,600 RPM and 21,100 sfpm (surface feet per minute) to cut C1020 steel of 2-½ inch diameter. During cutting, a plurality of standard wheels failed due to excessive wheel flutter while the segmented wheel cut through the 2-½ inch diameter round in 8 seconds at a feed rate of 18.8 linear inches per minute.

Further and vibration was reduced by increasing the clamping pressure and bolting the clamping flange and the fixed flange together closer to the circumferential or peripheral surface thereof. Thus the center or hub 12 was modified by replacing two in each group of the nine shoulder type segment locating and retaining members or pins 16 on the 24-½ inch base circle with two shoulder type clamping bolts 20 and threading the holes in the fixed flange of hub 12 to accomodate them. Another known method used to further reduce flutter was to rigidify or stiffen the drive center or hub 12 significantly by tensioning the reusable hub in any well known conventional manner, for example, by working or peening the metal.

Obviously, larger segmental cut-off wheels than the specific embodiment of the invention given above can be made by modifying the dimensions of the segments and the hub to accomodate a greater number of composite segments required to complete the wheel of greater diameter and circumference. Also, the number and diameter of the segment locating and retaining pins and/or bolts may be increased or decreased so long as there is sufficient strength in the total cross sectional area thereof to effectively oppose the calculated centrifugal load or force exerted by each abrasive portion of the segment bonded to the thinner segment base member during rotating at a predetermined speed and surface feet per minute.

Although the invention has been illustrated and described in specific embodiments, it is to be understood that many variations of and changes may be made therein without departing from the invention set forth in the following claims.

What is claimed is:

1. A relatively large high speed segmental cut-off grinding wheel comprising:
    a thin reusable drive center rotatable about its axis having
        a fixed flange portion with an outer annular recessed surface situated a predetermined axial distance from one side of the drive center and extending radially inward from a circumferential surface of the flange portion to a circular surface on the center;
    a thin removable annular clamping flange opposite and axially spaced from the fixed flange portion on the drive center so there is between the flanges a narrow groove extending from circumferential surfaces of the flanges a predetermined radial depth toward the axis of the drive center;
    a plurality of identical interchangeable and replaceable arcuate composite resin bonded abrasive segments equally spaced around and attached to the center and each composite segment having
        an arcuate resin bonded abrasive portion with opposite sides of predetermined radial depth and of greater axial thickness than the center, a segment base member having
        an axial thickness less than that of the center,
        an outer radial portion embedded in and resin bonded to the abrasive portion,
        a tongue portion, including a plurality of segment locating aperatures therein, situated equal distances from the opposite sides and extending radially inward from the abrasive portion into the narrow groove between the flanges, and
        at least one fiber glass reinforcing member resin bonded to the segment base member and extending radially through the abrasive portion;
    a plurality of identical, equally spaced groups of segment locating and retaining members extending axially through the locating aperatures in the tongue portion into axially aligned aperatures in the flanges and each identical group of the members having
        axes situated and equally spaced on a single base circle of predetermined radius from the axis of the drive center; and
    means for attaching the removable flange to the drive center and clamping the segment base member in place between the flanges.

2. A segmental cut-off grinding wheel according to claim 1 wherein the abrasive portion, the segment base member and the reinforcing member are bonded together with a cured thermosetting phenolic resin.

3. A segmental cut-off grinding wheel according to claim 2 wherein the abrasive composite segments with but one fiber glass reinforcing member therein are mounted in a staggered arrangement on the center so that at least one of the composite abrasive segments and the fiber glass reinforcing member therein will lie in a different rotational plane, whereby there is at least one abrasive cutting portion of the at least one abrasive segment rotating in the same plane as the fiber glass reinforcing member in another one of the composite segments on the wheel.

4. A segmental cut-off grinding wheel according to claim 3 wherein the segment locating and retaining members comprise:
    a plurality of shoulder type members attached to the fixed flange portion of the drive center.

5. A segmental cut-off grinding wheel according to claim 4 wherein the segment locating and retaining members further comprise:
    a plurality of removable bolts threaded into the fixed flange portion of the drive center.

6. A segmental cut-off grinding wheel according to claim 5 wherein each of the segment base members have a group of the locating holes of identical shape and size with axes located and equally spaced on a single base circle and at equal distances from opposite radial ends of the segment base member whereby the abrasive segments may be turned end for end to place either side thereof adjacent the annular recessed surface of the fixed flange portion, maintained in axial alignment, and interchangeable with other identical composite segments.

7. A segmental cut-off grinding wheel according to claim 6 wherein the segment base member has in the outer radial portion thereof:
    means for interlocking the abrasive portion to the segment base member.

8. A segmental cut-off grinding wheel according to claim 6 wherein the segment base member is a laminated structure comprising:
    a plurality of layers of closed mesh fiber glass woven roving material impregnated with and bonded together with a thermosetting phenolic resin to and in between two reinforcing members of open mesh fiber glass cloth.

9. A segmental cut-off grinding wheel according to claim 6 wherein the removable annular clamping flange is made of steel and comprises:
    a central hole,
    an outer annular recessed surface situated a predetermined axial distance from the first said outer annular recessed surface on the fixed flange and extending radially inward from a circumferential surface to a circular surface on the removable flange substantially in axial alignment with and of the same diameter as the first said circular surface on the center; and the drive center is made of steel and further comprises:

an inner annular recessed surface situated a predetermied axial distance from the outer annular recessed surface and extending radially inward from the first said circular surface to an inner circular surface of smaller diameter extending axially within the central hole in the removable annular clamping flange.

10. A segmental cut-off grinding wheel according to claim 9 wherein the means for attaching the removable annular clamping flange comprises:

a plurality of holes and clamping bolts extending through the removable flange and screw threaded into the center with axes equally spaced on a base circle of smaller diameter than that of the first mentioned base circle on which the segment locating and retaining members are situated; and a plurality of locating members, between the clamping bolts, attached to and extending from the center into locating holes in the clamping flange with their axes equally spaced on the base circle of smaller diameter and from the axes of the clamping bolts.

* * * * *